Figure 1:
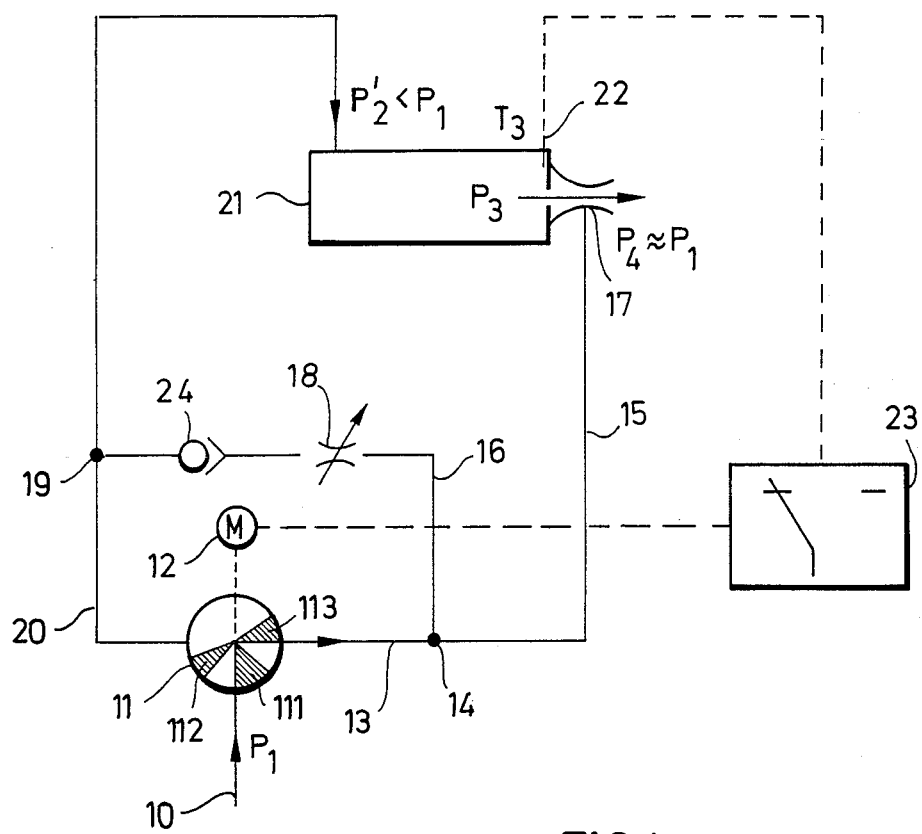

United States Patent [19]

Distelrath et al.

[11] Patent Number: 4,559,008
[45] Date of Patent: Dec. 17, 1985

[54] STARTING AID DEVICE FOR A HIGH PRESSURE COMBUSTION CHAMBER

[75] Inventors: Heinz D. Distelrath, Troisdorf; Herbert Wiegand, Cologne; Klaus Rath, Niederkassel; Klaus Bäumer, Bonn, all of Fed. Rep. of Germany

[73] Assignee: Deutsche Forschungs- und Versuchsanstalt fur Luft-und Raumfahrt e.v., Cologne, Fed. Rep. of Germany

[21] Appl. No.: 568,540

[22] Filed: Jan. 5, 1984

[30] Foreign Application Priority Data

Jan. 18, 1983 [DE] Fed. Rep. of Germany ....... 3301355

[51] Int. Cl.$^4$ .............................................. F23N 5/00
[52] U.S. Cl. ........................................ 431/63; 431/75; 431/158; 431/351
[58] Field of Search ...................... 431/158, 75, 62, 63, 431/351, 350, 10

[56] References Cited

U.S. PATENT DOCUMENTS

| | | | |
|---|---|---|---|
| 3,212,553 | 10/1965 | Cathala | 431/10 |
| 3,363,661 | 1/1968 | Horton | 431/158 |
| 4,063,870 | 12/1977 | Deruelle | 431/75 |
| 4,395,223 | 7/1983 | Okigami et al. | 431/10 |
| 4,396,368 | 8/1983 | Faccini et al. | 431/10 |

*Primary Examiner*—Carroll B. Dority, Jr.
*Attorney, Agent, or Firm*—Spensley Horn Jubas & Lubitz

[57] ABSTRACT

In the ignition and starting phase of a high pressure combustion chamber the device enables the flow velocity in the combustion pipe of the combustion chamber (21) to be reduced by the blocking air injected in counterflow through a slot nozzle in the narrowest cross section at the combustion chamber outlet (17) to such an extent that it is less than the flame propagation velocity. Owing to the fact that an adjustable throttle aperture (18) is fitted in the starting air line (16), during the starting process the pressure of the air jet issuing from the combustion chamber (21) is always less than the blocking air flow. As soon as a combustion chamber outlet temperature which can be associated with a stable state of operation in the combustion chamber (21) is measured on the temperature sensor (22), the drive (12) for the valve (11) is put into operation by means of a temperature-dependent switch-over device (23), which drive isolates the starting air line (16) and the blocking air line (15) from the air line (10) and connects this with the operating air line (20), and, because the valve (11) is designed with negative overlap, the air supply to the combustion chamber (21) is not interrupted.

17 Claims, 3 Drawing Figures

STARTING AID DEVICE FOR A HIGH PRESSURE COMBUSTION CHAMBER

The invention relates to a starting aid device for a high pressure combustion chamber which has a pressure inlet connected to a supply air line and a combustion chamber outlet, with a device for reducing the flow velocity through the combustion chamber outlet at a low combustion chamber temperature.

High pressure combustion chambers are used, for example, to simulate in wind tunnel tests the slipstream of the model of a missile propulsive unit. At the combustion chamber outlet of the high pressure combustion chamber the flow issues at sound velocity. It has proved to be difficult to start combustion in a high pressure combustion chamber because the flame stabilises with difficulty due to the high flow velocity produced with cold flow. Only once the flame has stabilised is there any increase of temperature in the combustion pipe. Assuming that the combustion chamber pressure is not altered, and that the combustion chamber geometry is maintained, then, in accordance with gas laws, when the temperature increases, the volume of air in the combustion pipe increases with the temperature, while the flow velocity at the combustion chamber outlet decreases with the temperature. The flow rate of air through the combustion chamber is inversely proportional to the root of the temperature. It follows from this that when the pressure combustion chamber is cold, there is a very high air flow rate which, after ignition, makes it difficult for the flame to stabilise, since the flow velocity is greater than the propagation velocity of the flame.

In order to stabilise the flame during starting, particular measures are necessary for the reasons stated. As in the region of the narrowest cross section of the combustion chamber outlet the flow always issues at sound velocity, starting with a fixed throttle to reduce the flow velocity is possible only if the starting phase passes into the operating phase without interruption. This applies, however, only to the case of a very narrow design- and operating range for the high pressure combustion chamber. If the high pressure combustion chamber is to be operated within a wide operating range, then in the starting phase the narrowest cross section at the combustion chamber outlet can be formed by a throttle consisting of an aluminium disc provided with a bore. As the bore of the aluminium disc is smaller than the cross section of the aperture at the narrowest point of the combustion chamber outlet, the flow in the starting phase is reduced to such a degree that the flow velocity in the combustion pipe becomes less than the propagation velocity of the flame, so that the flame is able to stabilise. As soon as the flame has stabilised, there is a great increase of temperature in the combustion pipe, whereby the aluminium disc inserted loosely into the combustion chamber pipe is burned away, thus creating at the combustion chamber outlet the larger cross section necessary for the operating phase.

The known starting aid devices for stabilising the flame in the starting phase have the disadvantage that additional fittings are necessary in the combustion chamber outlet, and that the combustion residues of the fittings may pollute the wind tunnel wherein the high pressure combustion chamber is used. There is the disadvantage, also, that the starting aid device will become inoperative after starting has ended, so that it may no longer be used for temperature regulation in the operating phase.

The object underlying the invention is to create a starting aid device of the aforementioned type which, without fittings, reduces during the starting phase the active cross section of the combustion chamber outlet to such a degree that the flow velocity in the combustion pipe is always less than the flame propagation velocity, and which, moreover, also allows regulating action during the operating phase.

In order to achieve this object, the invention provides for the combustion chamber outlet to have a slot nozzle connected to a blocking air line, through which at a relatively low combustion chamber temperature air can be injected into the combustion chamber outlet in counterflow to the exhaust flow.

The active cross section of the combustion chamber outlet is reduced, if required, by a blocking air flow supplied in counterflow, so that solid fittings in the combustion chamber outlet are not necessary.

Even for the case where, during operation at too high an exhaust flow velocity, the fuel becomes thin, then, by supplying blocking air, the exhaust flow can be throttled to such a degree that the flame is not extinguished. When the high pressure chamber is operated inside a wind tunnel, it is thereby possible to prevent pollution of the wind tunnel as a result of false starts or as a result of the combustion chamber being extinguished being avoided. Direct access to the combustion chamber incorporated in a missile model is possible as a rule only by way of expensive and time consuming dismantling operations. In order for the blocking air to be able to reduce the active cross section of the combustion chamber outlet, it must have a higher pressure than the air jet issuing from the combustion chamber.

A preferred embodiment of the invention provides for the air line to be connectable via a valve arrangement with the supply air line and with the blocking air line in such a way that, in one position of the valve arrangement, the supply air line is connected with the air line, and the blocking air line is blocked, and, in another position of the valve arrangement, the supply air line is connected via a pressure reducer with the air line, while the blocking air line is connected with the air line without any substantial fall in pressure. The has the advantage that both the supply air and the blocking air can be supplied by a single air line. In the starting phase, the pressure reducer ensures that the pressure of the blocking air is greater than that of the supply air. In the operating phase, on the other hand, the air line can be connected without pressure reducer directly with the supply air line. The valve arrangement can consist of one or of several valves which are mutually adjustable in a time-related manner.

Preferably, the air line may be connected via a valve alternately either with the supply air line or with the blocking air line, and the blocking air line is connected via a pressure reducer with the supply air line. On this occasion only one single valve is required, the supply air branching off from the blocking air line in the starting phase and subsequently being reduced in pressure by the pressure reducer. The level of pressure reduction has to be determined from tests for each type of combustion chamber. For this purpose, the pressure reducer is preferably adjustable. The valve can be switched over either in bursts or steadily.

Preferably, the pressure reducer is connected in series with a nonreturn valve which is open only in the direction from the blocking air line to the supply air line. As a result, there is only one-way flow through the pressure reducer, and, in the operating phase, no blocking air—not even with reduced pressure—reaches the slot nozzle.

A particularly advantageous embodiment of the invention provides for a temperature sensor monitoring the combustion chamber outlet temperature to control a switch-over device for the valve or the valve arrangement respectively, in such a way that the blocking air line is connected with the air line only when the combustion chamber outlet temperature is below a limit value. The temperature sensor therefore connects the blocking air line in the starting phase, or, also, with any fall in the operating temperature as a result of the fuel becoming thin, in the operating phase. This not only produces a reliable starting performance, but also, in the operating phase, prevents any unintentional extinguishing of the flame.

A particularly advantageous transition from the starting phase to the operating phase is achieved if the valve is continuously adjustable by a motor and has between two switch positions an overlap region wherein both the operating air line and the blocking air line are connected with the pressure source. This overlap region can free the complete aperture cross sections to said two lines in a transition phase, the valve can also be designed in such a way, however, that in the transition phase in each case only throttled cross sections are freed.

The slot nozzle is preferably a ring nozzle which encircles the combustion chamber outlet at its narrowest point and in this way effect symmetrical constriction of the flow over its entire circumference.

An exemplary embodiment of the invention is described in greater detail in the following with reference to the drawings.

Figure 2:
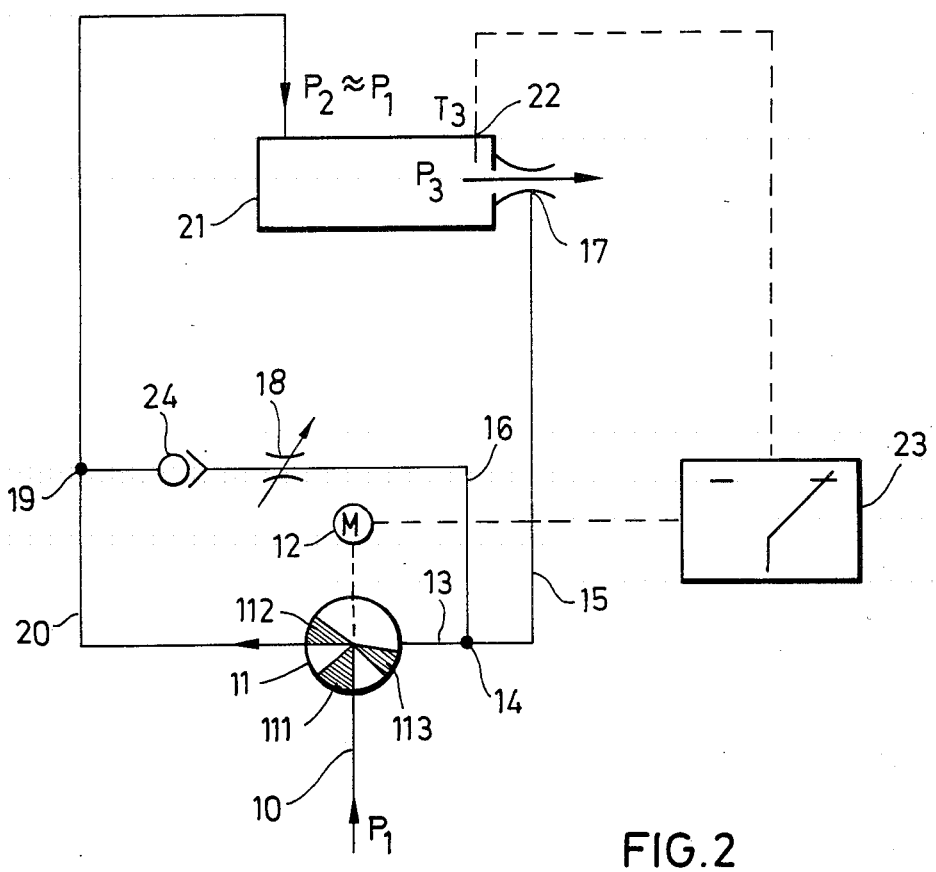
Figure 3:
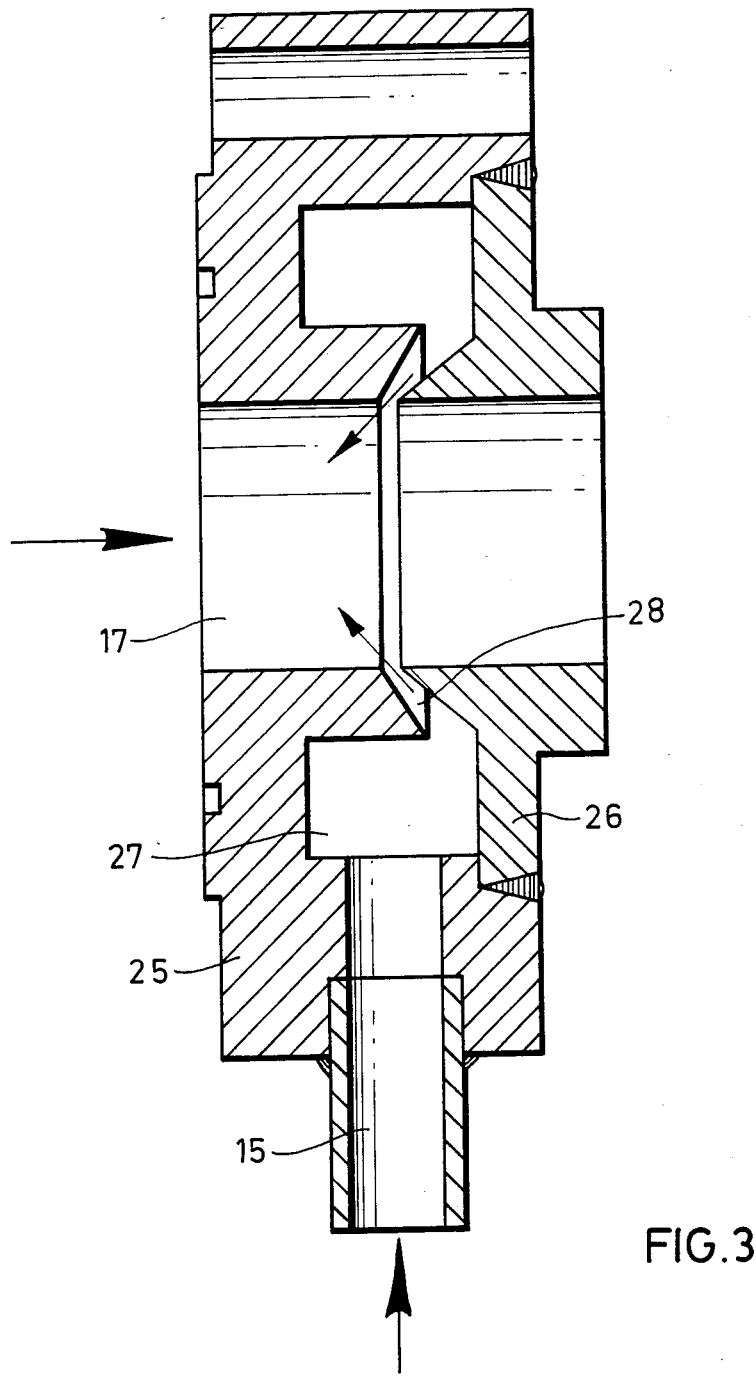

FIG. 1 shows a schematic representation of the design of the starting aid device for a high pressure combustion chamber, the valve being shown in the starting phase, FIG. 2 shows the same representation as FIG. 1, but in the operating phase, and FIG. 3 shows a longitudinal section through the point of the narrowest cross section at the combustion chamber outlet with the slot nozzle.

According to FIG. 1 air under high pressure is conducted from the air line 10 via a valve 11 designed as a ball valve into a pressure line 13 which branches at the point 14 into the blocking air line 15 and the starting air line 16. The valve 11 is adjustable via a drive 12 which may be an electric, hydraulic or pneumatic actuating drive. The air, which is under a pressure $p_4 \simeq p_1$, is conducted through the blocking air line 15 to the narrowest cross section of the combustion chamber outlet 17 where it is introduced in counterflow and has a blocking effect on the air jet issuing from the combustion chamber 21.

In the starting air line 16, the starting air is reduced by an adjustable pressure reducer 18 to the pressure $p_2'$ which is less than $p_1$, so that also $p_2' < p_4$. The pressure differential between $p_2'$ and $p_4$, which is optimal for the starting process, has to be determined by tests for each type of combustion chamber. At the point 19 the starting air line 16 joins with the operating air line 20 which supplies the high pressure combustion chamber 21 with highly compressed air via a pressure inlet. As soon as the temperature sensor 22 measures a temperature $T_3$ which can be associated with a stable operating state in the combustion chamber 21, the switch-over device 23 controlled by the temperature sensor 22 responds in order to put the drive 12 into operation and to regulate the valve 11.

The valve 11 has an inlet 111 constantly connected with the air line 10 and two outlets 112 and 113. In the position represented in FIG. 1 the outlet 113 is connected with the pressure line 13 and, via this, with the blocking air line 15 and with the starting air line 16. In the operating phase represented in FIG. 2, the inlet 111 is also connected with the air line 10, while the outlet 112 is connected with the operating air line 20. The outlets 112 and 113 each span overlapping angle of rotation ranges of the valve 11 so that the valve 11 is designed with "negative overlap". This means that in a brief transition phase between the two end positions of the valve 11 represented in the FIGS. 1 and 2, the air line 10 is connected both with the supply air line 20 and also with the blocking air line 15.

In the position represented in FIG. 2, the starting phase has ended and the compressed air flows from the air line 10 via the valve 11 into the operating air line 20 and from there to the high pressure combustion chamber 21. In this phase, the pressure line 13 is isolated from the air supply so that the blocking air line 15 and the starting air line 16 are also no longer under pressure. In order to prevent air from the operating air line 20 entering the starting air line 16 during the operating phase, a nonreturn valve 24 is fitted in the starting air line 16.

According to FIG. 3 the annular slot nozzle 28, which consists of the two annular parts 25 and 26 fixedly connected together, is arranged at the narrowest point of the combustion chamber outlet 17. Via the blocking air line 15 the blocking air reaches an annular chamber 27 formed between the parts 25 and 26 and flows through the annular slot nozzle 28 with radial component in counterflow to the combustion chamber flow into the combustion chamber outlet 17. In this way the active cross section of the combustion chamber outlet 17 is made smaller. The flow velocity in the combustion pipe is reduced by radial injection of air which is under a substantially higher pressure than the air leaving the combustion chamber, so that the flame can stabilise. The valve 11 is not changed over to the position represented in FIG. 2, so that the blocking air line 15 is closed and the pressure in the supply air line 20 is brought to the full pressure $p_1$, until the temperature in the combustion pipe has reached such a value that the flow velocity is reduced by the increase in volume to a value which is less than the propagation velocity of the flame.

If in the operating phase, for example as a result of thinning of the fuel-air mixture, the temperature at the combustion chamber outlet falls below the permissible operating value, the valve 11 is adjusted by the drive 12 and blocking air is injected into the combustion chamber outlet 17, until it has been stabilised and the temperature has again reached the permissible minimum value.

We claim:

1. A starting aid device for a high pressure combustion chamber having a pressure inlet, a supply air line connected to the pressure inlet, and a combustion chamber outlet, comprising a device for reducing the flow velocity through the combustion chamber outlet at a low combustion chamber temperature, wherein the combustion chamber outlet has a slot nozzle connected to a blocking air line, and through which, at a low combustion chamber temperature, air can be injected into the combustion chamber outlet in counterflow to the exhaust flow; and wherein an inlet air line is connected via a valve arrangement with the supply air line and the blocking air line such that, in one position of the valve arrangement, the supply air line is connected to the inlet air line and the blocking air line is blocked, and in another position of the valve arrangement, the supply air line is connected via a pressure reducer to the inlet air line while the blocking air line is connected with no essential fall in pressure to the inlet air line.

2. A starting aid device according to claim 1 wherein the inlet air line is connected via said valve arrangement alternately either to the supply air line or to the blocking air line, and the blocking air line is connected via the pressure reducer to the supply air line.

3. A starting aid device according to claim 1, wherein the pressure reducer is connected in series with a nonreturn valve which is open to the supply air line and is closed in the direction of the blocking air line.

4. A starting aid device according to claim 2, wherein a temperature sensor monitoring the combustion chamber outlet temperature controls a switch-over device for the valve arrangement such that the blocking air line is only connected to the inlet air line when the combustion chamber outlet temperature is below a limit value.

5. A starting aid device according to claim 2, wherein the valve arrangement is continuously adjustable by a drive means and has, between two end positions, an overlap region in which both the supply air line and the blocking air line are connected with the inlet air line.

6. A starting aid device according to claim 1, wherein the said slot nozzle is a ring nozzle which encircles the combustion chamber outlet at its narrowest point.

7. An apparatus for aiding operation of a high pressure combustion chamber, comprising:
    (a) a combustion chamber outlet through which exhaust flows from the combustion chamber; and
    (b) blocking means for producing a blocking air stream flowing into said combustion chamber outlet in a direction substantially opposite to the exhaust direction, said blocking air stream being effective to reduce the exhaust flow velocity through the combustion chamber outlet, valve means for selectively allowing said blocking air stream to flow into said combustion chamber outlet only when the temperature of the combustion chamber outlet is below a limit value.

8. The apparatus of claim 7, said blocking means comprising an annular ring nozzle through which air enters the combustion chamber outlet in an annular pattern to form said blocking air stream, said ring nozzle encircling the combustion chamber outlet.

9. The apparatus of claim 7 wherein the blocking air stream enters into said combustion chamber outlet through an annular slot nozzle which encircles the combustion chamber outlet, and the annular slot is angled toward the combustion chamber.

10. The apparatus of claim 7 further including a supply means for supplying air to said combustion chamber, a reducer means for reducing the air pressure of the supplied air, said valve means further capable of selectively passing the supplied air through said reducer means.

11. The apparatus of claim 10 further including sensor means for monitoring the temperature of the combustion chamber outlet, said valve means being responsive to said sensor means such that said valve means directs the blocking air stream into said combustion chamber outlet and the supplied air through said reducer means when said temperature is below said limit value, and said valve means prevents blocking air stream flow into said combustion chamber outlet and directs the supplied air directly into said combustion chamber when said temperature is above said limit value.

12. An apparatus for aiding operation of a high pressure combustion chamber, comprising:
    (a) a combustion chamber outlet through which exhaust flows from the combustion chamber;
    (b) a blocking means for producing a blocking air stream flowing into said combustion chamber outlet in a direction substantially opposite to the exhaust direction when the combustion chamber outlet temperature is below a limit value; and
    (c) terminating means for terminating said blocking air stream flow when the combustion chamber outlet temperature rises above the limit value.

13. The apparatus of claim 12 wherein said blocking air stream enters into said combustion chamber outlet through an annular slot nozzle which encircles the combustion chamber outlet, and the annular slot is angled toward the combustion chamber.

14. The apparatus of claim 12 further including a supply means for supplying air to said combustion chamber; and wherein said terminating means comprises:
    a sensor means for monitoring the temperature at the combustion chamber outlet; and
    a valve switch means responsive to said sensor means such that said valve switch means directs the blocking air stream into said combustion chamber outlet and the supplied air into said combustion chamber when said temperature is below a limit value, and prevents blocking air stream flow and directs supplied air into the combustion chamber when said temperature is above the limit value.

15. An apparatus for aiding operation of a high pressure combustion chamber, comprising:
    (a) a combustion chamber outlet through which exhaust flows from the combustion chamber;
    (b) a counterflow means for selectively producing an annular air stream within the combustion chamber outlet in counterflow to the exhaust direction only when the combustion chamber outlet temperature is below a limit value, thereby effectively reducing the cross-section of the combustion chamber outlet.

16. The apparatus of claim 15 wherein said means comprises an annular slot nozzle which encircles the combustion chamber outlet, and the annular slot is angled toward the combustion chamber.

17. The apparatus of claim 15 further including:
    a supply means for supplying air to said combustion chamber;
    a sensor means for monitoring the temperature at the combustion chamber outlet; and
    wherein said counterflow means further comprises:
    a valve means responsive to said sensor means such that when said temperature is below a limit value, said valve means directs the blocking air stream into said combustion chamber outlet and the supplied air into said combustion chamber, and when said temperature is above the limit value, prevents blocking air stream flow and directs supplied air flow into the combustion chamber.

* * * * *